(12) United States Patent
Cates et al.

(10) Patent No.: US 10,816,214 B2
(45) Date of Patent: Oct. 27, 2020

(54) SEALED DAMPER

(71) Applicants: Michael Ross Cates, Knoxville, TN (US); John Brad Faerber, Knoxville, TN (US)

(72) Inventors: Michael Ross Cates, Knoxville, TN (US); John Brad Faerber, Knoxville, TN (US)

( * ) Notice: Subject to any disclaimer, the term of this patent is extended or adjusted under 35 U.S.C. 154(b) by 661 days.

(21) Appl. No.: 15/067,942

(22) Filed: Mar. 11, 2016

(65) Prior Publication Data

US 2016/0265785 A1 Sep. 15, 2016

Related U.S. Application Data

(60) Provisional application No. 62/131,497, filed on Mar. 11, 2015.

(51) Int. Cl.
| | |
|---|---|
| *F24B 1/189* | (2006.01) |
| *F16J 15/10* | (2006.01) |
| *F23J 13/08* | (2006.01) |
| *F23L 11/00* | (2006.01) |
| *F23L 13/02* | (2006.01) |

(52) U.S. Cl.
CPC .............. *F24B 1/1895* (2013.01); *F16J 15/10* (2013.01); *F23J 13/08* (2013.01); *F23L 11/005* (2013.01); *F23L 13/02* (2013.01)

(58) Field of Classification Search
CPC ...................................................... F24B 1/1895
See application file for complete search history.

(56) References Cited

U.S. PATENT DOCUMENTS

| | | | | |
|---|---|---|---|---|
| 24,832 | A * | 7/1859 | Treadwell ............... | F23L 11/02 126/293 |
| 421,141 | A * | 2/1890 | Rankin ................. | F24B 1/1895 126/539 |
| 440,229 | A * | 11/1890 | Keith ...................... | F23L 11/02 126/293 |
| 613,835 | A * | 11/1898 | Coulston ................ | F23L 11/02 126/293 |
| 1,048,197 | A * | 12/1912 | Mueller, Jr. ............ | F23L 11/02 126/293 |
| 1,186,303 | A * | 6/1916 | Frost ....................... | F23L 11/02 236/45 |
| 1,278,987 | A * | 9/1918 | Nordwall .............. | F24B 1/1895 126/539 |

(Continued)

FOREIGN PATENT DOCUMENTS

GB 2098710 A * 11/1982

*Primary Examiner* — Avinash A Savani
*Assistant Examiner* — Martha M Becton
(74) *Attorney, Agent, or Firm* — Robinson IP Law, PLLC

(57) ABSTRACT

A sealed chimney damper is provided for preventing flow of air between an interior and exterior of a structure through a chimney. The sealed damper includes a damper body having an inlet aperture and an outlet aperture; an upper flange formed around the outlet aperture of the damper body; a valve plate hingedly secured to the damper body adjacent the outlet aperture, the valve plate sized to substantially cover the outlet aperture when the valve plate is in a closed position; and a gasket secured to the upper flange of the damper body and surrounding the outlet aperture, wherein the gasket is positioned between the valve plate and damper body when the valve plate is in a closed position.

14 Claims, 13 Drawing Sheets

(56) References Cited

U.S. PATENT DOCUMENTS

| | | | | |
|---|---|---|---|---|
| 1,361,782 A | * | 12/1920 | Tandy | F24B 1/1895 126/537 |
| 1,415,522 A | * | 5/1922 | Cain | F24B 1/1895 126/538 |
| 1,454,538 A | * | 5/1923 | Donley | F24B 1/1895 126/537 |
| 1,470,325 A | * | 10/1923 | Huston | F23L 11/02 236/45 |
| 1,498,292 A | * | 6/1924 | Podmore | F24B 1/1895 126/538 |
| 1,503,387 A | * | 7/1924 | Sturges | F23L 11/02 126/285 R |
| 1,516,688 A | * | 11/1924 | Rodgers | F24B 1/1895 126/536 |
| 1,549,231 A | * | 8/1925 | Stokes | F24B 1/1895 126/538 |
| 1,605,704 A | * | 11/1926 | Brunander | F24B 1/1895 126/538 |
| 1,650,159 A | * | 11/1927 | Serdyn | F24B 1/1895 126/536 |
| 1,655,858 A | * | 1/1928 | Donovan | F23L 11/02 110/157 |
| 1,657,369 A | * | 1/1928 | Chapman | F24B 1/1895 126/538 |
| 1,669,825 A | * | 5/1928 | Guy | F24B 1/1895 126/536 |
| 1,734,013 A | * | 10/1929 | Jones, Jr. | F24B 1/1895 126/538 |
| 1,783,418 A | * | 12/1930 | Field | F23L 11/02 236/45 |
| 1,837,061 A | * | 12/1931 | Ohran | F24B 1/1895 126/538 |
| 1,862,456 A | * | 6/1932 | Barrows | F24B 1/1895 126/538 |
| 1,888,999 A | * | 11/1932 | Meyer | F24B 1/1895 126/539 |
| 1,895,202 A | * | 1/1933 | Montgomery | F23L 13/02 126/292 |
| 1,928,165 A | * | 9/1933 | Boldt | F24B 1/1895 126/536 |
| 1,943,342 A | * | 1/1934 | Mortimer | F23L 11/02 126/293 |
| 1,946,568 A | * | 2/1934 | Butler | F23L 11/02 236/45 |
| 1,973,997 A | * | 9/1934 | Roberts | F23L 11/02 236/45 |
| 2,011,103 A | * | 8/1935 | Franz | F23L 11/02 126/293 |
| 2,026,866 A | * | 1/1936 | Chadwick | F23L 11/02 236/45 |
| 2,033,398 A | * | 3/1936 | Rogers | F23L 11/02 236/45 |
| 2,073,386 A | * | 3/1937 | Cunningham | F23L 11/02 236/45 |
| 2,122,641 A | * | 7/1938 | Frentzel, Jr. | F23L 11/02 236/45 |
| 2,207,291 A | * | 7/1940 | Hedstrom | F23L 13/00 126/536 |
| 2,216,101 A | * | 9/1940 | Roseman | F24B 1/1895 126/538 |
| 2,328,332 A | * | 8/1943 | Filkins | F24F 13/1426 126/286 |
| 2,433,749 A | * | 12/1947 | Field, Jr. | F23L 11/02 236/45 |
| 2,514,583 A | * | 7/1950 | Miller | F24B 1/1895 126/536 |
| 2,522,786 A | * | 9/1950 | Hubbart | F23L 11/02 236/45 |
| 2,605,968 A | * | 8/1952 | Stephenson | F23L 3/00 236/45 |
| 2,665,683 A | * | 1/1954 | Snook | F24B 1/1895 126/504 |
| 2,704,502 A | * | 3/1955 | Rainey | F23J 13/08 126/539 |
| 2,740,398 A | * | 4/1956 | Collins | F24B 1/1895 126/242 |
| 2,825,506 A | * | 3/1958 | Steinen | F23L 11/02 236/45 |
| 2,854,967 A | * | 10/1958 | Robinson | F24B 1/1895 126/538 |
| 2,966,153 A | * | 12/1960 | Robinson | F24B 1/1895 126/536 |
| 2,996,064 A | * | 8/1961 | Haas | F24B 1/1895 126/504 |
| 3,377,939 A | * | 4/1968 | Sailors | F23J 13/08 454/7 |
| 4,015,587 A | * | 4/1977 | Wincek | F23L 11/00 126/539 |
| 4,165,679 A | * | 8/1979 | Lyemance | F23J 13/08 126/286 |
| 4,235,219 A | * | 11/1980 | DeFoe | F23L 11/005 126/504 |
| 4,334,520 A | * | 6/1982 | La Pointe | F24B 1/1895 126/536 |
| 4,351,361 A | * | 9/1982 | Worley | F16K 1/2261 137/375 |
| 4,368,663 A | * | 1/1983 | Tabacco | F23J 13/08 126/286 |
| 4,483,315 A | * | 11/1984 | Carriveau | F24B 1/1895 126/286 |
| 4,509,498 A | * | 4/1985 | England | F24B 1/1895 126/286 |
| 4,528,897 A | * | 7/1985 | Homolik | F23J 13/08 16/289 |
| 4,635,616 A | * | 1/1987 | Jones | F24B 1/1895 126/285 R |
| 4,691,624 A | * | 9/1987 | Moore | F23J 13/08 126/286 |
| 4,821,473 A | * | 4/1989 | Cowell | A62C 4/04 126/297 |
| 5,160,291 A | * | 11/1992 | Sexton | F23L 11/005 126/286 |
| 2006/0219236 A1 | * | 10/2006 | Formosa | F23L 11/005 126/319 |
| 2009/0235916 A1 | * | 9/2009 | Rossetti | F16K 15/038 126/292 |

\* cited by examiner

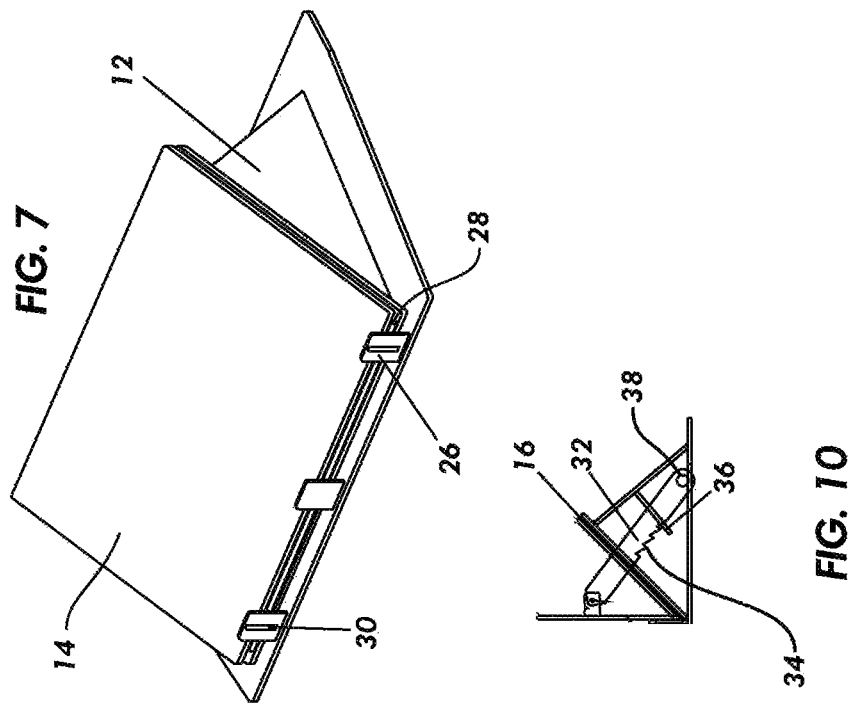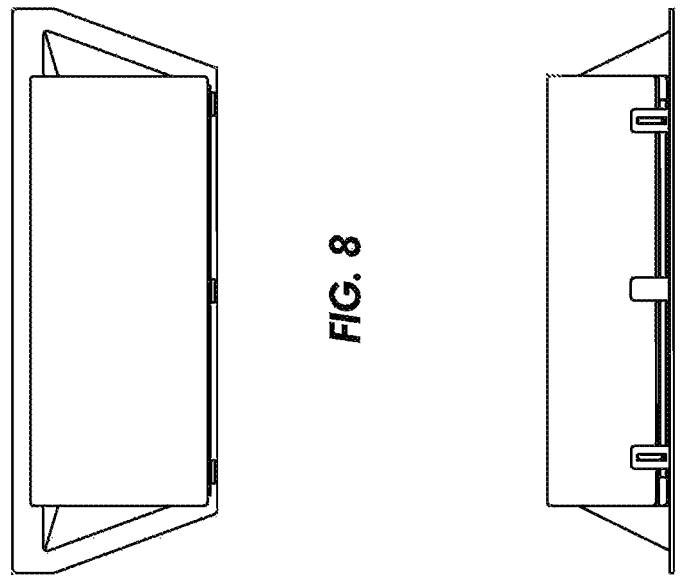

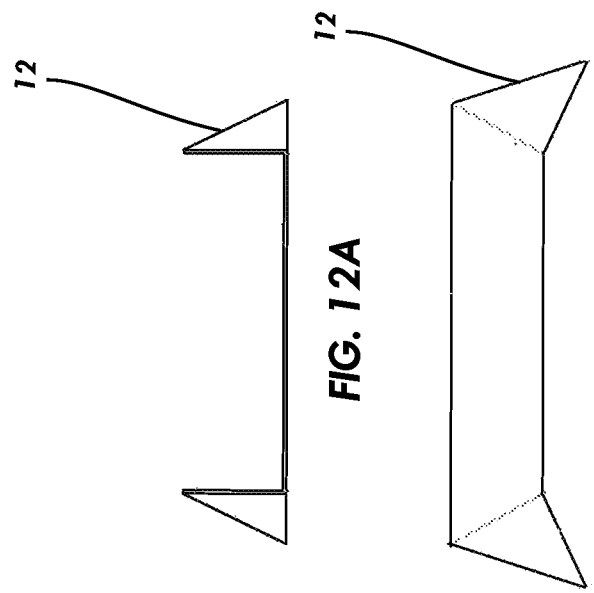
FIG. 12A
FIG. 12B
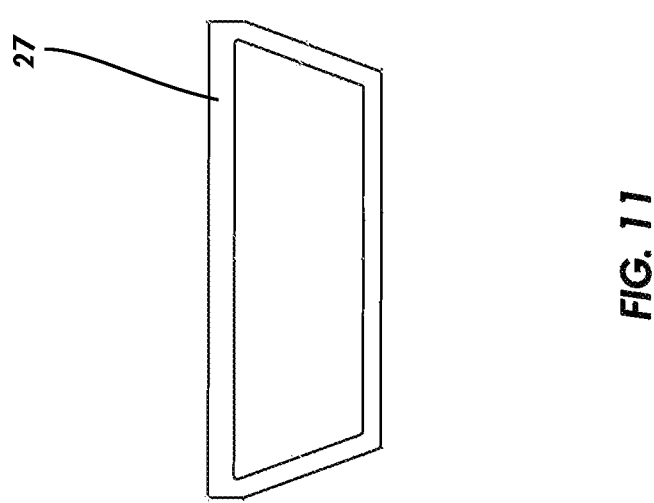
FIG. 11

SEALED DAMPER

CROSS-REFERENCE TO RELATED APPLICATION

This application claims priority to U.S. Patent Application Ser. No. 62/131,497 to John B. Faerber et al. for a Sealed Damper, which was filed on Mar. 11, 2015, the contents of which are incorporated herein by reference in its entirety.

FIELD

This disclosure relates to the field of chimney dampers. More particularly, this disclosure relates to an energy efficient chimney damper for reducing heating or cooling loss through a chimney of a structure.

BACKGROUND

Fireplace dampers are typically installed in an upper portion of a fireplace and are configured to be opened while the fireplace is in use or closed when not in use. When closed, the damper may reduce the amount of air lost from a chimney of a home. The damper may further reduce the amount of rainwater allowed into a fireplace or prevent animals and insects from traveling into the fireplace.

While traditional dampers may reduce the amount of air lost from a home, the construction of the damper still allows a large amount of air to escape through the damper, even when the damper is in a closed position. Other attempts to prevent the escape of air from a home or entry of outside air into the home have included chimney caps mounted at a top of the chimney or plug type devices inserted into the chimney. However, these devices are typically difficult to install and are not configured to readily seal or unseal a chimney.

What is needed, therefore, is an efficient damper for reducing heating and cooling losses through the chimney of a structure.

SUMMARY

A sealed chimney damper is provided for preventing flow of air between an interior and exterior of a structure through a chimney. In a first aspect, the sealed damper includes a damper body having an inlet aperture and an outlet aperture, an upper flange formed around the outlet aperture of the damper body, a valve plate positioned adjacent the outlet aperture of the damper body, the valve plate sized to substantially cover the outlet aperture when the valve plate is in a closed position, and a gasket secured to the upper flange of the damper body and surrounding the outlet aperture, wherein the gasket is positioned between the valve plate and damper body when the valve plate is in a closed position.

In one embodiment, the outlet aperture is positioned at an angle of from about 15° to about 60° relative to the inlet aperture. In another embodiment, the damper further includes an elongate hinge bar between the valve plate and damper body, wherein the hinge bar maintains the valve plate at a radius above the gasket to substantially prevent binding of the valve plate and gasket. In yet another embodiment, the damper further includes one or more hinge stops adjacent the valve plate wherein the hinge stops prevent the valve plate from opening beyond an angle of approximately 90° relative to the damper body.

In one embodiment, the damper further includes one or more alignment bars positioned adjacent the one or more hinge stops when the valve plate is in an open position wherein the one or more alignment bars maintain the valve plate 14 in alignment with the damper body when the valve plate moves from a closed position to the open position. In another embodiment, at least one of the one or more hinge stops includes a slot formed therethrough for receiving one of the one or more alignment bars.

In yet another embodiment, the gasket comprises a tadpole gasket having a bulb portion and a flange portion. In one embodiment, the damper further includes one or more fasteners inserted through the flange portion of the gasket and upper flange of the damper body for securing the gasket to the damper body. In another embodiment, the gasket is attached to the upper flange of the damper body with a high temperature adhesive.

In one embodiment, the damper further includes a lever pivotally attached to a mount on the valve plate. In another embodiment, the damper further includes a lower flange attached to a bottom of the damper body and positioned around the inlet aperture of the damper.

In a second aspect, a sealed damper is provided including: a damper body having an inlet aperture formed along a bottom portion of the damper body, an outlet aperture formed along a top portion of the damper body, the outlet aperture angled from about 15 to about 60 relative to the inlet aperture, a lower flange formed around the inlet aperture, and an upper flange formed around the outlet aperture, the upper flange including a flat surface; a valve plate hingedly secured to the damper body adjacent the outlet aperture, the valve plate sized to substantially cover the outlet aperture when the valve plate is in a closed position; a gasket secured to the flat surface of the upper flange of the damper body, the gasket including a bulb portion and a flange portion; an elongate hinge bar positioned between the valve plate and damper body, wherein the hinge bar maintains the valve plate at a radius above the gasket when the valve plate is moved between a closed position and open position; and one or more hinge stops extending upwardly from the lower flange of the damper body adjacent the valve plate to prevent the valve plate from opening beyond an angle of approximately 90° relative to the damper body.

In one embodiment, the sealed damper further includes a lever pivotally attached to the valve plate and a strike plate attached to the damper body, wherein the lever engages the strike plate to maintain the valve plate in an open position relative to the outlet aperture.

BRIEF DESCRIPTION OF THE DRAWINGS

Further features, aspects, and advantages of the present disclosure will become better understood by reference to the following detailed description, appended claims, and accompanying figures, wherein elements are not to scale so as to more clearly show the details, wherein like reference numbers indicate like elements throughout the several views, and wherein:

FIG. 7 shows a schematic illustration of a sealed damper according to one embodiment of the present disclosure;

FIG. 8 shows a schematic top view illustration of a sealed damper according to one embodiment of the present disclosure;

FIG. 9 shows a schematic front view illustration of a sealed damper according to one embodiment of the present disclosure;

FIG. 10 shows a schematic side view illustration of a sealed damper according to one embodiment of the present disclosure;

FIG. 11 shows a schematic top view of a lower flange of a sealed damper according to one embodiment of the present disclosure;

FIGS. 12A and 12B show a schematic view of a damper body of a sealed damper according to one embodiment of the present disclosure;

DETAILED DESCRIPTION

Various terms used herein are intended to have particular meanings. Some of these terms are defined below for the purpose of clarity. The definitions given below are meant to cover all forms of the words being defined (e.g., singular, plural, present tense, past tense). If the definition of any term below diverges from the commonly understood and/or dictionary definition of such term, the definitions below control.

A sealed damper for a chimney is provided, the sealed damper configured to provide a seal between an interior of a structure and a chimney of the structure to reduce the escape of air from within the structure or the entry of outside air into the structure. The sealed damper is positioned adjacent a fireplace of the structure and towards a bottom of the chimney flue such that the sealed damper is readily operable by a user to both open and close the damper based on use of the fireplace.

Figure 1:
FIG. 1 shows a perspective view of a sealed damper according to one embodiment of the present disclosure.
Figure 2:
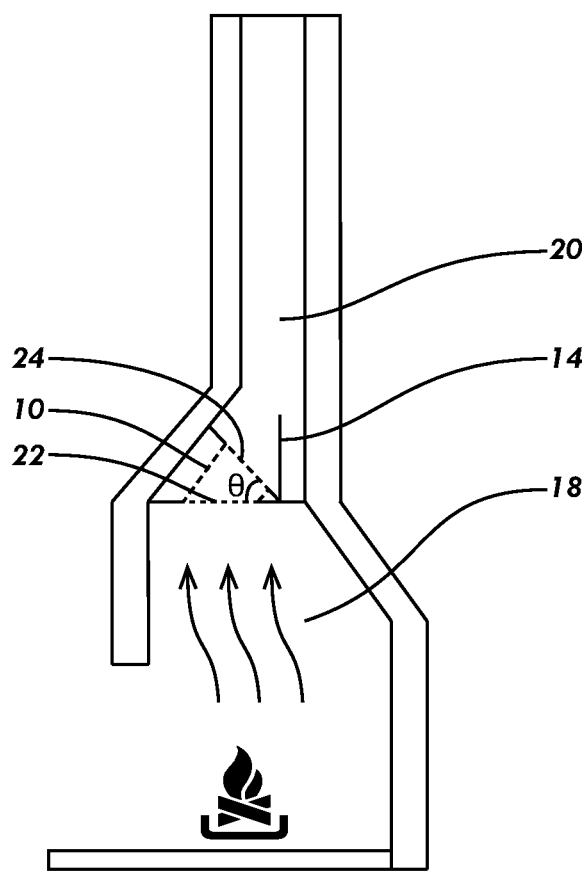
FIG. 2 shows a schematic illustration of a fireplace, chimney flue, and damper according to one embodiment of the present disclosure.

FIG. 1 shows a basic embodiment of a sealed chimney damper 10, the sealed damper 10 including a damper body 12, a valve plate 14, and a gasket 16. As shown in FIG. 2, the damper 10 is configured to be positioned adjacent a fireplace 18 and in fluid communication with a chimney flue 20 such that smoke from a fire in the fireplace 18 enters the damper 10 through an inlet aperture 22 of the damper 10 and exits the damper through an outlet aperture 24 of the damper 10 into the chimney flue 20.

The damper body 12 and valve plate are preferably formed of steel, such as mild steel, having a thickness of from about ⅛ to about ½ inch, and preferably having a thickness of approximately ¼" inch. Alternatively, the damper body and valve plate are formed of cast iron or other like materials. Further, the damper body is substantially solid and nonporous to prevent any gases from passing through the damper body other than through the inlet aperture 22 and outlet aperture 24.

Referring now to FIG. 2, the outlet aperture 24 is positioned such that an angle Θ of the outlet aperture is from about 15° to about 60° relative to the position of the inlet aperture 22. The inlet aperture 22 may be positioned substantially horizontal above the fireplace 18 such that smoke rising from the fireplace enters the inlet aperture 22. The outlet aperture 24 is angled, for example, at approximately 45° relative to the horizontal inlet aperture 22 such the smoke from the fireplace 18 exits the outlet aperture into the adjacent chimney flue 20.

Figure 3:
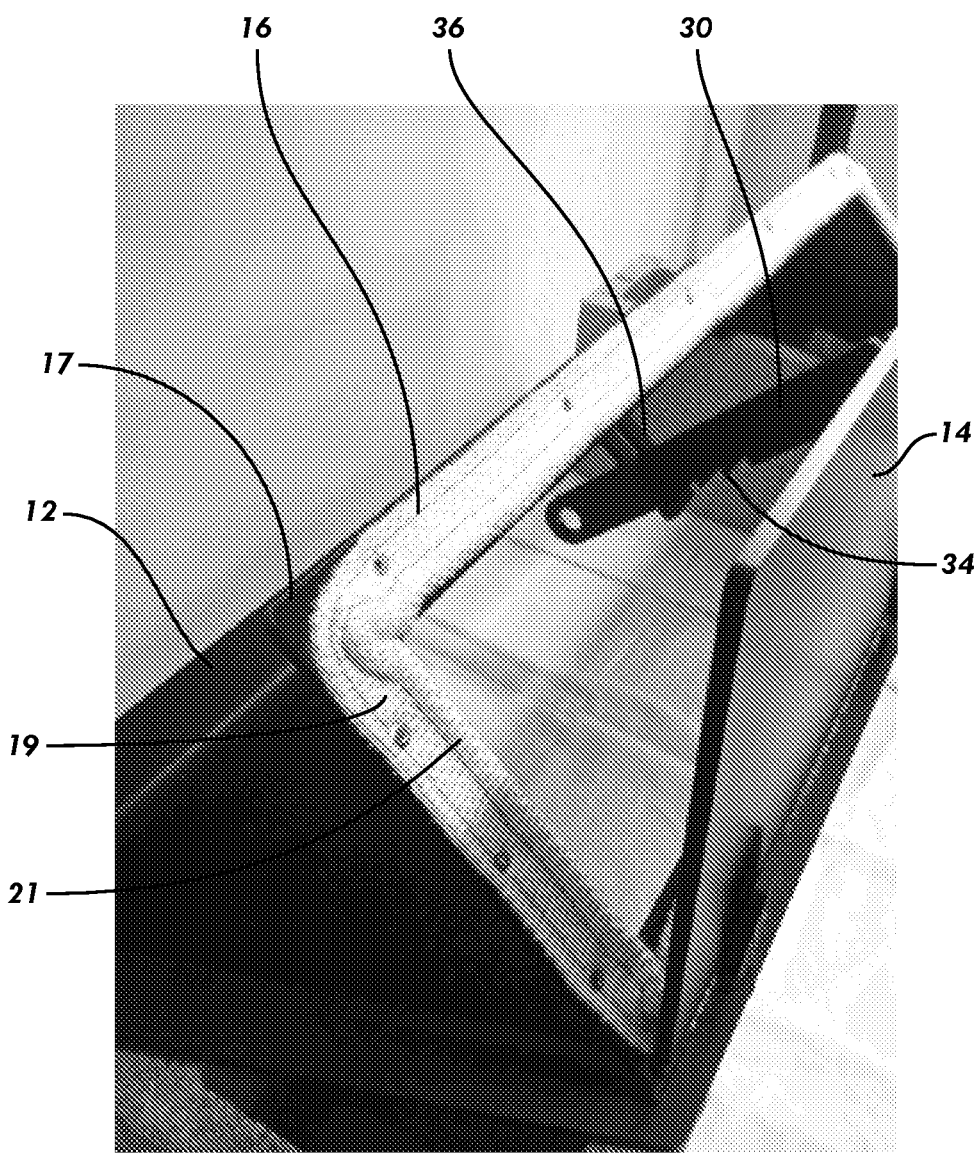
FIG. 3 shows a perspective top view of a sealed damper in an open position according to one embodiment of the present disclosure.

The gasket 16 is attached to the damper body 12 around the outlet aperture 24 of the damper 10. Referring to FIG. 3, an upper flange 17 is formed around the outlet aperture 24 of the damper body 12. The upper flange 17 includes a substantially flat surface for receiving the gasket 16, the flat surface having a width approximating that of the gasket 16. The gasket 16 is secured to the upper flange 17 of the damper body 12 around the outlet aperture 24. The gasket 16 is preferably formed of a compressible high temperature fiberglass material such that the gasket 16 is able to withstand high temperatures and smoke associated with a fire within the fireplace 18. The gasket 16 is preferably configured to withstand temperatures of up to 2,000° C. Further, the gasket 16 preferably has a thickness of from about $1/16^{th}$ inch to about ½ inch.

While the above describes an upper flange 17 attached to the damper body 12 for receiving the gasket 16, it is also understood that the gasket 16 may be attached directly to the damper body 12 around the outlet aperture 24 without the upper flange 17. For example, the gasket 16 may be attached directly to an upper edge of the damper body 12 such that the gasket 16 is positioned around the outlet aperture 24 of the damper 10. The gasket 16 is positioned and at least a portion of the gasket overlaps an upper edge of the damper body 12 around the outlet aperture 24 such that the gasket 16 is compressed between the damper body 12 and valve plate 14 when the valve plate 14 is in a closed position.

The gasket 16 may be formed of a "tadpole" type gasket having a gasket flange 19 and a bulb portion 21, the gasket also including a fiberglass cover and fiberglass core and is rated to a temperature of approximately 1,000° C. The bulb may have a diameter of approximately ⅛ inch and the gasket may have an overall width of 1⅛ inches with a flange thickness of ⅛ inch. The above is one example of a suitable gasket with it being understood that other gaskets of various size and shapes, such as flat gaskets, may be secured between the valve plate 14 and damper body 12.

The gasket 16 is secured to flat surface of the upper flange 17 on the damper body 12 around a circumference of the outlet aperture 24 such that the outlet aperture 24 is substantially surrounded by the gasket 16 as shown in FIG. 3. The gasket 16 is secured to the damper body 12 using one or more fasteners such as rivets, screws or bolts secured, for example, through the gasket flange 19 and upper flange 17 of the damper body 12. Alternatively, the gasket 16 may be secured to the upper flange 17 of the damper body 12 using a high-temperature adhesive.

Figure 4:
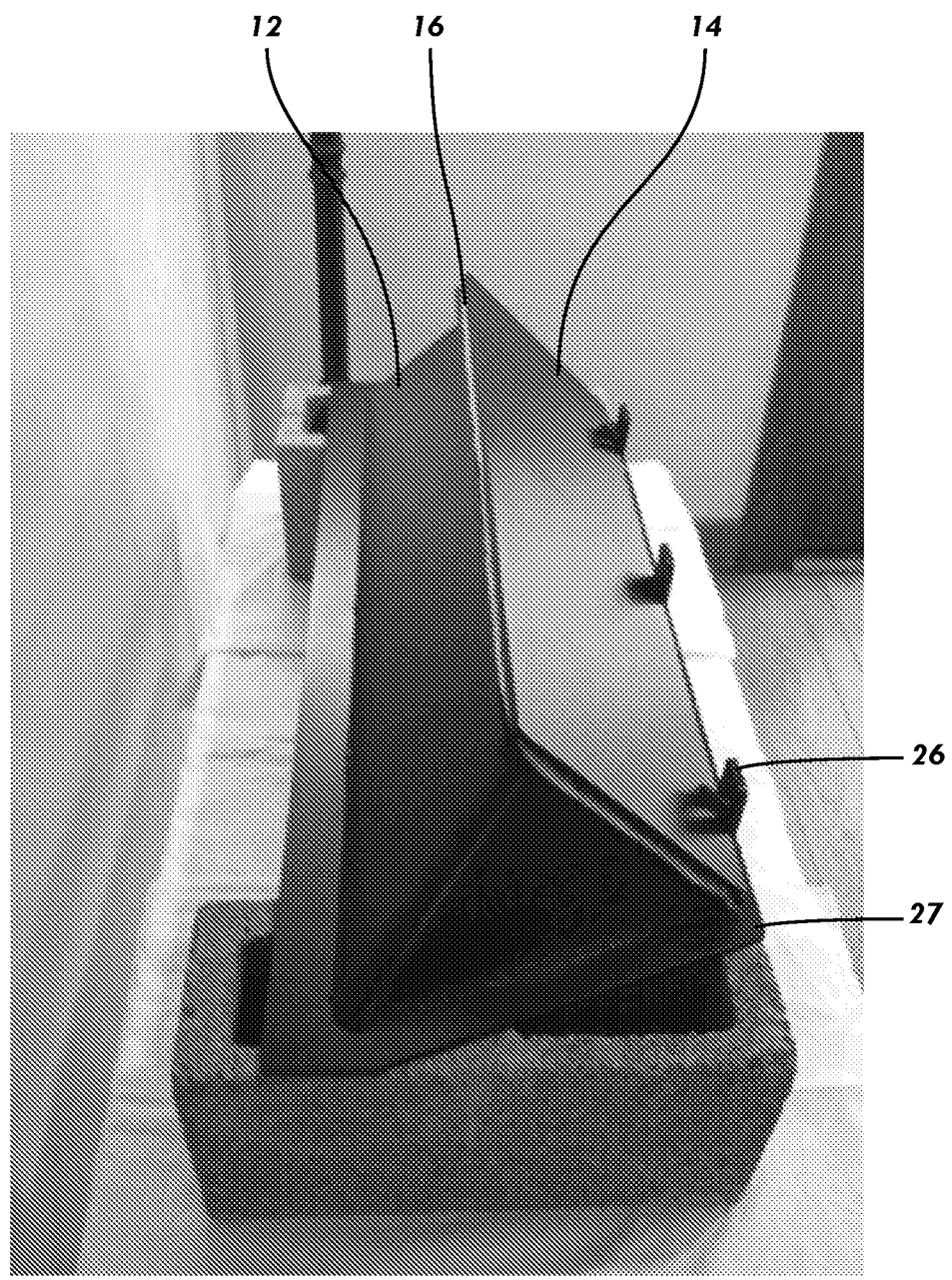
FIG. 4 shows a perspective view of a sealed damper in a closed position according to one embodiment of the present disclosure.

The valve plate 14 is positioned adjacent to the damper body 12 and is configured such that the valve plate 14 hinges with respect to the damper body 12. The valve plate 14 is capable of moving from an open position wherein the outlet aperture 24 of the damper body 12 is substantially unobstructed by the valve plate 14 (FIG. 1 and FIG. 10) to a closed position (FIG. 4 and FIG. 7) wherein the valve plate 14 rests adjacent the gasket 16 around the outlet aperture 24 and substantially blocks the outlet aperture 24. Referring to FIG. 4, when the damper 10 is in a closed position such that the valve plate 14 rests adjacent the gasket 16 around the outlet aperture 24, the gasket 16 is substantially compressed between the valve plate 14 and the upper flange 17 of the damper body 12. In the closed position, the valve plate 14 compresses the bulb portion 21 of the gasket 16 to create a seal between the fireplace 18 and chimney flue 20.

Figure 5:
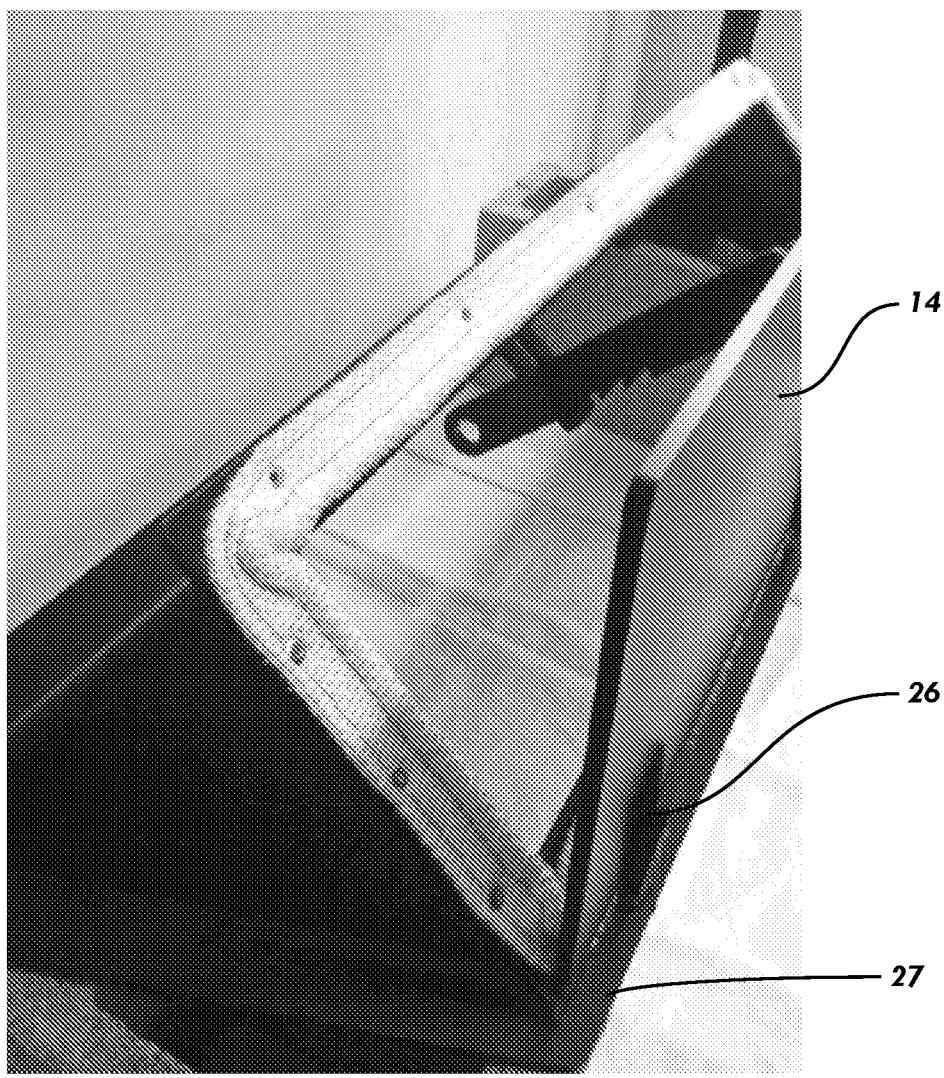
FIG. 5 shows a perspective side view of a sealed damper according to one embodiment of the present disclosure.

Referring to FIG. 5, the damper body 12 includes one or more hinge stops 26 for contacting the valve plate 14 when the valve plate 14 is in the open position to prevent the valve plate 14 from moving past a position of approximately 90° relative to the horizontal inlet aperture 22. The one or more hinge stops 26 are attached to a lower flange 27 positioned around and adjacent to the inlet aperture 22. The hinge stops 26 extend upward from the lower flange 27 and contact the valve plate 14 when the valve plate 14 is in a fully opened position (FIG. 3).

Figure 6A:
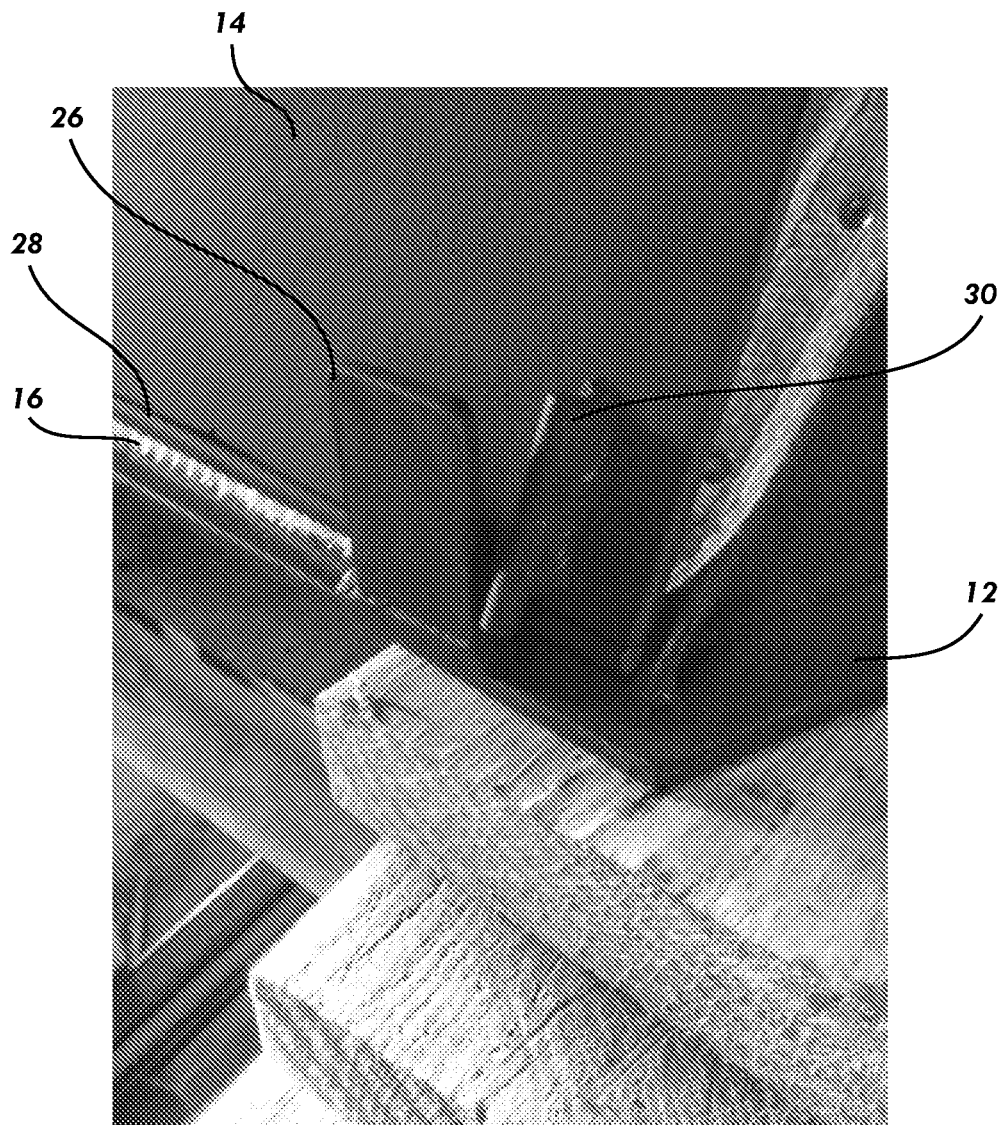
FIGS. 6A and 6B show a close-up view of a sealed damper according to one embodiment of the present disclosure.

The sealed damper 10 includes an elongate hinge bar 28 positioned along a width of the valve plate 14 adjacent the one or more hinge stops 26 between the valve plate 14 and the damper body 12, as shown in FIG. 6A. The hinge bar 28 may have a diameter of from about ¼" to about 1". Preferably the hinge bar 28 has a diameter of approximately ⅜". The valve plate 14 rotates about the hinge bar 28 as the valve plate 14 moves between an open position and closed position to prevent the valve plate 14 from becoming hinge-bound against the gasket 16. The hinge bar 28 maintains an edge of the valve plate 14 at a radial distance from the damper body 12 to allow the valve plate 14 to fully close on top of the gasket 16. While the damper preferably includes a hinge bar, it is also understood that other like hinges may be used to maintain the valve plate 14 at a radius above the gasket 16 during opening or closing of the valve plate 14 and prevent the valve plate 14 from becoming hinge-bound against the gasket 16 or otherwise interfering with the gasket 16.

In one embodiment, the valve plate 14 is maintained in place adjacent the damper body 12 by a weight of the valve plate 14, and the valve plate 14 is not otherwise attached or secured to the damper body 12. The weight of the valve plate 14 maintains the valve plate 14 against the one or more hinge stops 26 to prevent the valve plate 14 from sliding off of the angled outlet aperture 24 of the damper body 12. The valve plate 14 pivots about an edge of the valve plate 14 that is adjacent to the one or more hinge stops 26 when the valve plate is moved between an open and closed position.

While the above description contemplates a separate hinge bar 28 for supporting the valve plate 14, it is also understood that the damper body 12 and hinge stops 26 may be shaped to prevent binding of the valve plate 14 as it moves between the open and closed positions. In one configuration, the hinge stops 26 and damper body 12 are formed as a single piece, such as by casting the damper body 12 and hinge stops 26. The single piece damper body 12 and hinge stops 26 may include a substantially rounded portion where the hinge stops 26 join with the damper body 12 and where the valve plate 14 rests against the hinge stops 26. An edge of the valve plate 14 contacts the rounded portion and encourages the valve plate 14 to pivot with respect to the damper body 12.

Figure 6B:
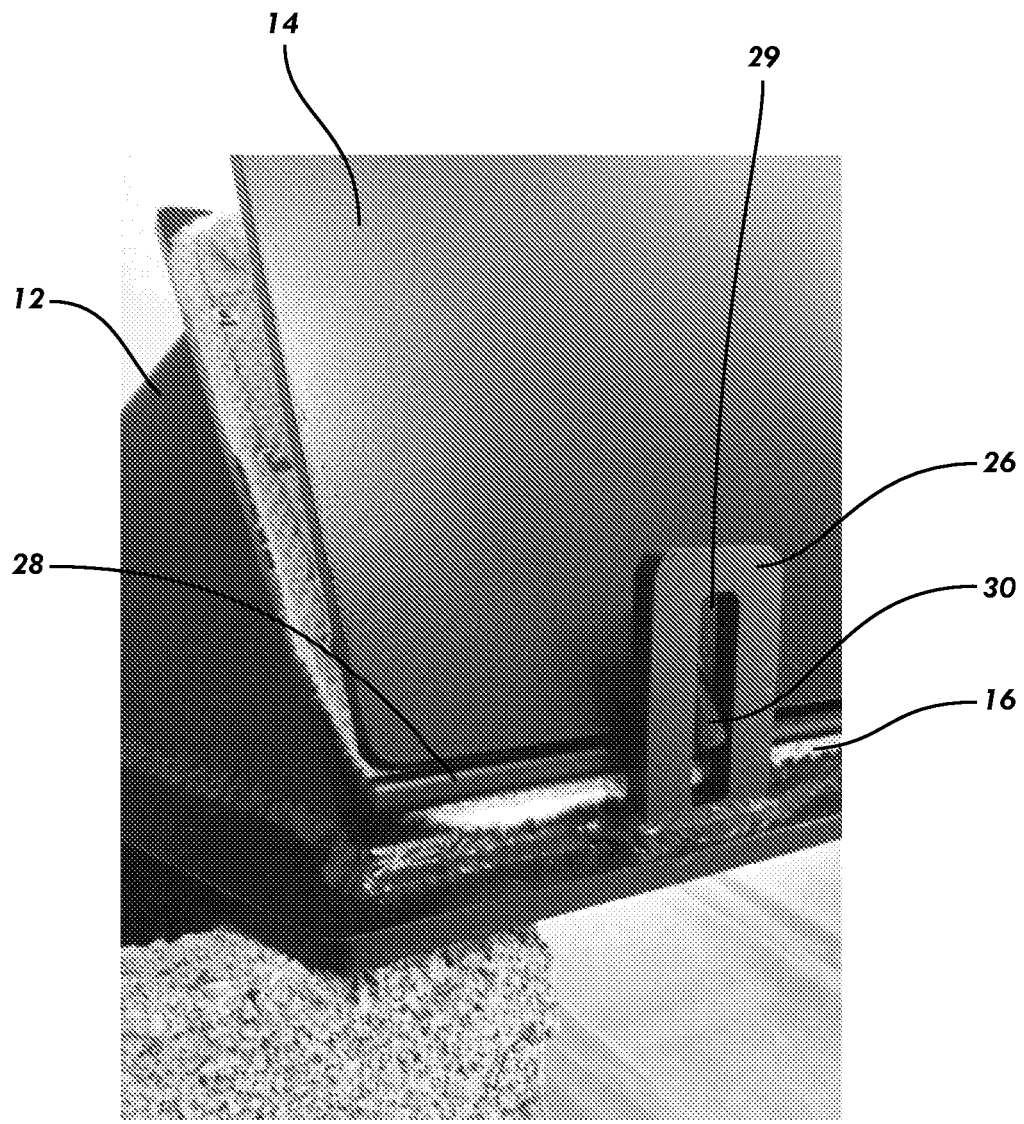

With further reference to FIGS. 6A and 6B, the sealed damper 10 further includes one or more alignment bars 30 for maintaining the valve plate 14 in alignment with the damper body 12 as the valve plate 14 hinges from the closed position to the open position. The one or more alignment bars 30 may be secured to the valve plate 14 such that they engage the one or more hinge stops 26 as the valve plate moves from the closed position to the open position. The one or more alignment bars 30 maintain the valve plate 14 in alignment with the damper body 12 such that as the valve plate 14 moves from the open position to the closed position, the valve plate 14 rests against the gasket 16 and substantially covers the outlet aperture 24.

Referring to FIG. 6B, the hinge stops 26 may include a slot 29 for receiving the hinge bar 28 and thereby maintaining the valve plate 14 in alignment with the damper body 12 as the valve plate 14 moves between the open and closed positions. The slot 29 may be formed through one or more of the hinge stops 26 and is sized to receive at least one of the alignment bars 30 as the valve plate 14 hinges from the closed position to the open position.

Figure 15:
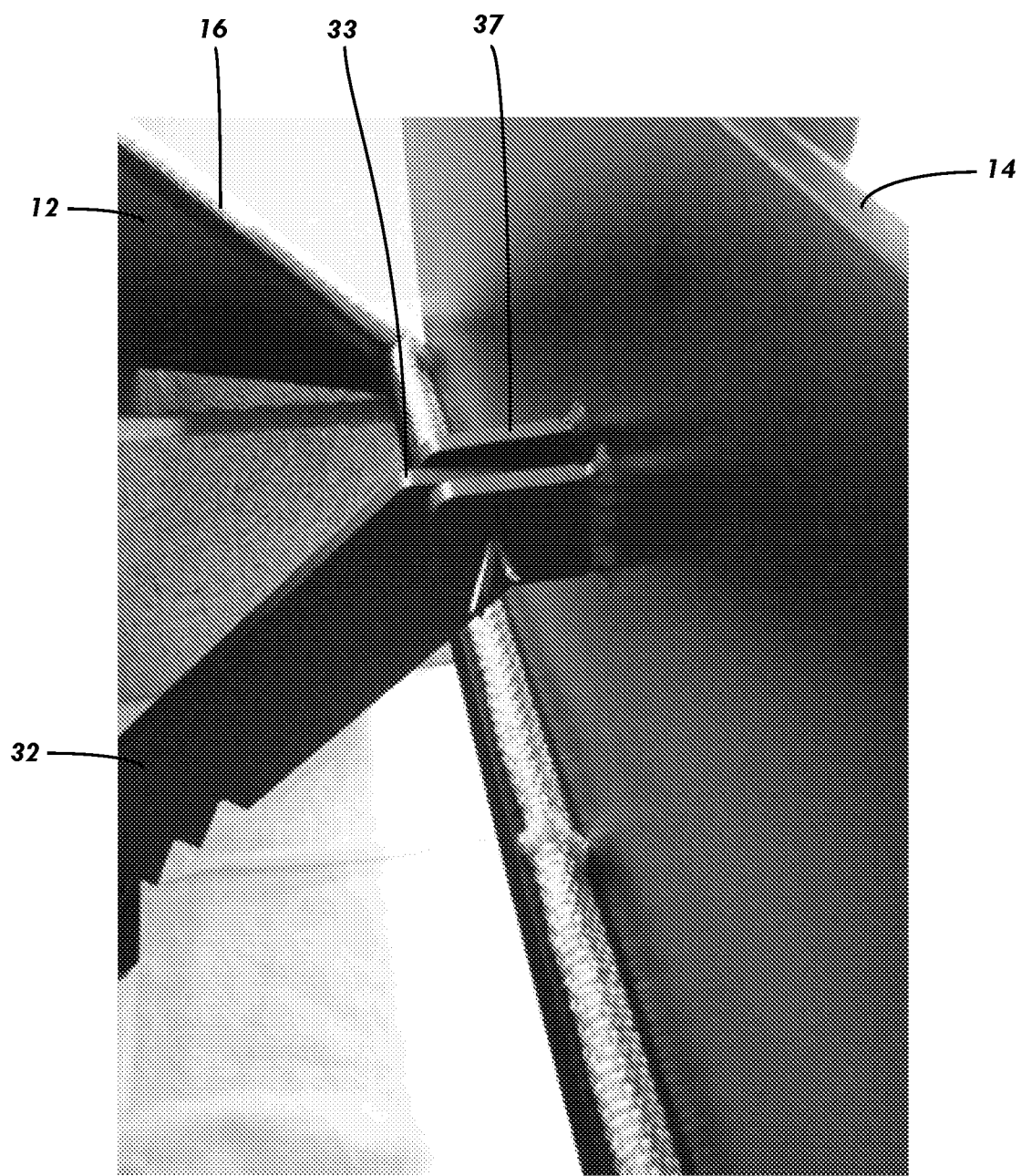
Figure 16:
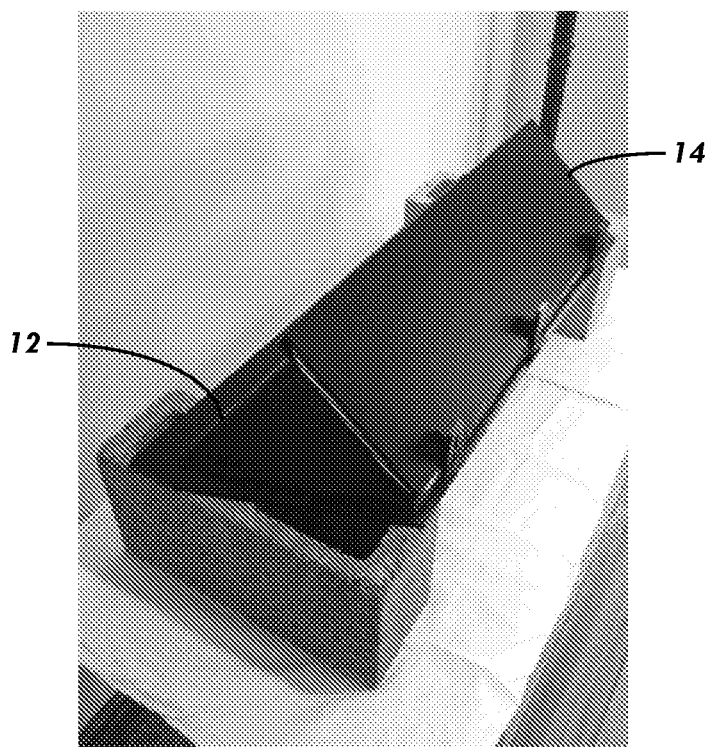

Referring again to FIG. 3, the sealed damper 10 may further include a lever arm 32 pivotally secured at a first end 33 (FIG. 15) to a mount 37 on the valve plate 14 for moving the valve plate 14 from the closed position to the open position. A second end of the lever arm 32 includes one or more teeth 34 for engaging a strike plate 36 of the damper body 12 (FIG. 10). The one or more teeth 34 of the lever arm 32 engage the strike plate 36 and support the lever arm 32 and attached valve plate 14 such that the valve plate 14 may be maintained at various angled open positions. A bore 38 is formed through the second end of the lever arm 32 such that the lever arm may be engaged by a fireplace poker or other tool to move the lever arm 32, thereby moving the valve plate 14 from the open position to the closed position and vice versa.

Figure 13:
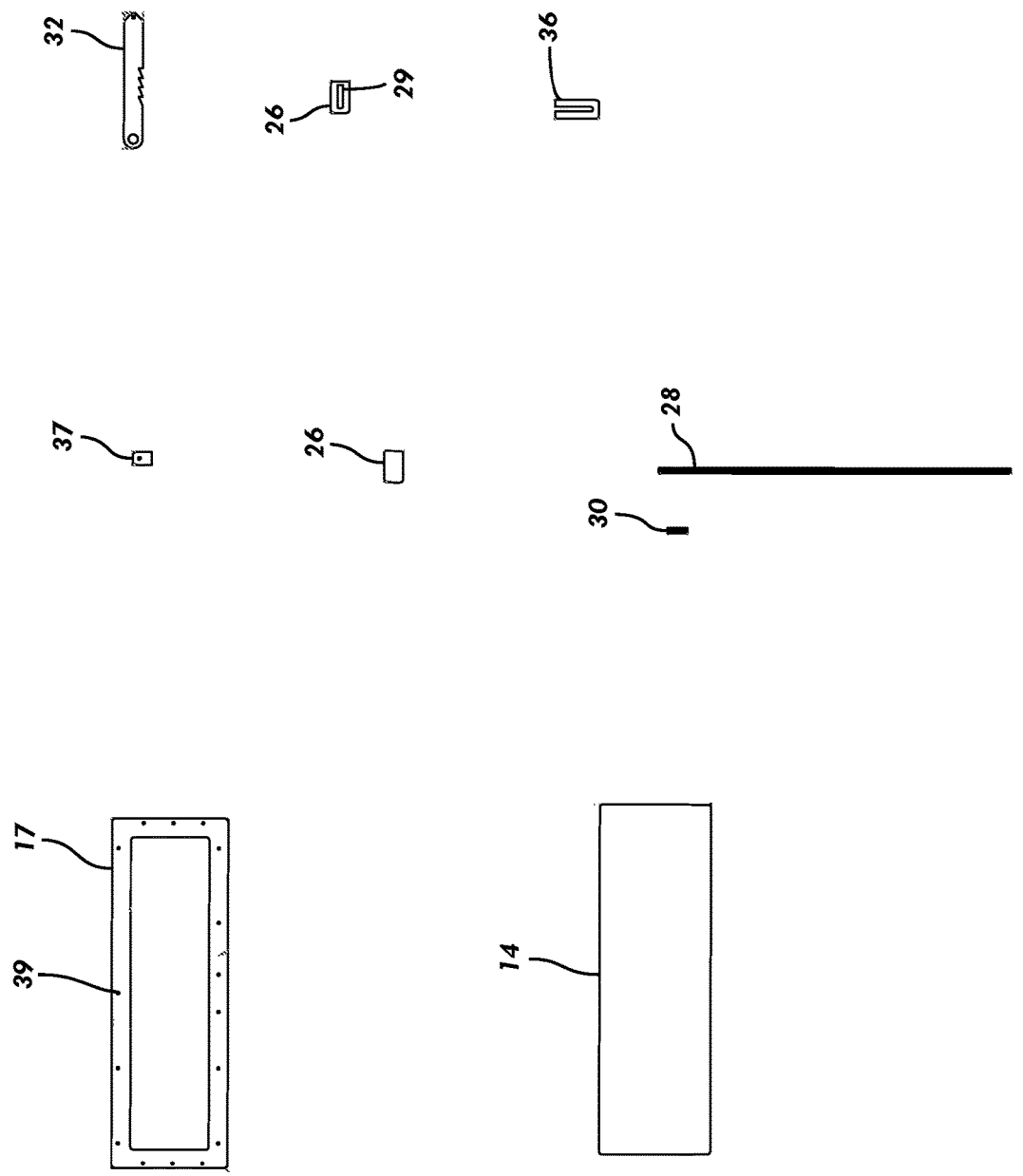
FIG. 13 shows a schematic illustration of components of a sealed damper according to one embodiment of the present disclosure.
Figure 14:
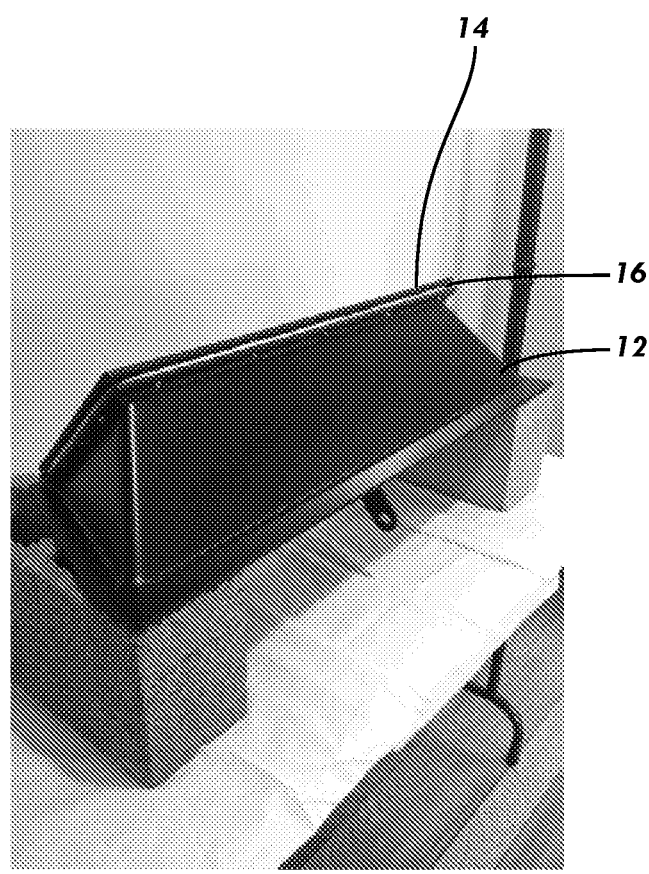
FIGS. 14-16 show additional views of a sealed damper according to one embodiment of the present disclosure.

FIGS. 11-13 illustrate various components of the sealed damper 10. FIGS. 11 and 12 illustrate the lower flange 27 and damper body 12. FIG. 13 illustrates the upper flange 17 including one or more bores 39 formed through the upper flange 17 for receiving one or more fasteners to secure the gasket 16 to the upper flange 17. FIG. 13 also illustrates various other components of the damper 10 including the valve plate 14, hinge bar 18, and hinge components. The lower flange 27, damper body 12, and upper flange 17 may be formed by laser cutting or other like machining and welded to one another to form the damper body 12.

The sealed damper 10 substantially prevents air from escaping through the chimney of a home while also preventing outside air from entering the home by forming a seal between the valve plate 14, gasket 16 and damper body 12. In the opened position, the lever arm 32 supports the valve plate 14 such that air may pass through the inlet and outlet apertures 22 and 24 of the damper 10 and out of the chimney flue 20, and the hinge bar 28 supports the valve plate 14 such that the valve plate 14 may open without binding with the gasket 16 located around the outlet aperture 24 of the damper 10. When the valve plate 14 is in the closed position, the weight of the valve plate 14 compresses the gasket to form a seal. The sealed damper 10 is sized for standard chimney dimensions such that the damper may be installed in either new structures being constructed or, alternatively, may be retro-fitted to existing structures with various chimney dimensions.

The foregoing description of preferred embodiments of the present disclosure has been presented for purposes of illustration and description. The described preferred embodiments are not intended to be exhaustive or to limit the scope of the disclosure to the precise form(s) disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the concepts revealed in the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. A sealed chimney damper comprising: a damper body including
an inlet aperture in fluid communication with a fireplace,
an outlet aperture in fluid communication with a chimney flue, and
a plurality of damper walls extending between the inlet aperture and the outlet aperture,
an upper flange formed around the outlet aperture of the damper body, the flange including a flat surface formed thereon,
a lower flange formed around the inlet aperture of the damper and
at least one hinge stop projecting upwardly from the lower flange;
a valve plate positioned adjacent to the outlet aperture of the damper body, the valve plate sized to substantially cover the outlet aperture when the valve plate is in a closed position; and
a gasket secured to the flat surface formed on the flange of the damper body and surrounding the outlet aperture;
wherein in an open position, an edge of the valve plate rests against the lower flange and the at least one hinge stop extending upwardly therefrom, and wherein in the open position the valve plate is not substantially supported on the gasket;
wherein in a closed position, the valve plate substantially rests on the gasket to create a seal between the valve plate and the damper body to prevent substantial loss of air through the sealed chimney damper when the fireplace is not in use.

2. The chimney damper of claim 1, wherein the at least one hinge stop prevent the valve plate from opening beyond an angle of approximately 90° relative to the damper body.

3. The chimney damper of claim 2, wherein the damper body and one or more hinge stops are formed as a single cast piece.

4. The chimney damper of claim 1, further comprising one or more alignment bars positioned adjacent the one or more hinge stops when the valve plate is in an open position wherein the one or more alignment bars maintain the valve plate 14 in alignment with the damper body when the valve plate moves from a closed position to the open position.

5. The chimney damper of claim 4, wherein at least one of the one or more hinge stops includes a slot formed therethrough for receiving one of the one or more alignment bars.

6. The chimney damper of claim 1, wherein the gasket comprises a tadpole gasket having a bulb portion and a flange portion.

7. The chimney damper of claim 6, further comprising one or more fasteners inserted through the flange portion of the gasket and the flat surface of the flange of the damper body for securing the gasket to the damper body.

8. The chimney damper of claim 6, wherein the gasket is attached to the flat surface of the flange of the damper body with a high temperature adhesive.

9. The chimney damper of claim 1, wherein the outlet aperture is positioned at an angle of from about 15° to about 60° relative to the inlet aperture.

10. The chimney damper of claim 1, further comprising an elongate hinge bar between the valve plate and damper body, wherein the hinge bar supports the valve plate at a radius above the gasket to substantially prevent binding of the valve plate and gasket.

11. The chimney damper of claim 1, further comprising a lever pivotally attached to a mount on the valve plate.

12. The chimney damper of claim 1, further comprising a lower flange attached to a bottom of the damper body and positioned around the inlet aperture of the damper.

13. A sealed chimney damper comprising:
an inlet aperture formed along a bottom portion of the damper body in fluid communication with a fireplace;
an outlet aperture formed along a top portion of the damper body in fluid communication with a chimney flue, the outlet aperture angled from about 15 to about 60 relative to the inlet aperture;
a plurality of damper walls extending between the inlet aperture and the outlet aperture,
a lower flange formed around the inlet aperture; and
an upper flange formed around the outlet aperture and extending outwardly orthogonally from the damper body, the upper flange including a flat surface formed thereon;
at least one hinge stop projecting upwardly from the lower flange;
a valve plate hingedly secured to the damper body adjacent the outlet aperture, the valve plate sized to substantially cover the outlet aperture when the valve plate is in a closed position, wherein a surface of the valve plate is aligned with the flange formed around the outlet aperture of the damper body when the valve plate is in the closed position;
a gasket secured to the flat surface of the flange of the damper body, the gasket including a bulb portion and a flange portion; an elongate hinge bar positioned between the valve plate and damper body, wherein the hinge bar maintains the valve plate at a radius above the gasket when the valve plate is moved between a closed position and an open position; and
one or more hinge stops extending upwardly from the lower flange of the damper body adjacent the valve plate to prevent the valve plate from opening beyond an angle of approximately 900 relative to the damper body;
wherein in the open position, an edge of the valve plate rests against the lower flange and the at least one hinge stop extending upwardly therefrom, and wherein in the open position the valve plate is not substantially supported on the gasket;
wherein in the closed position, the valve plate substantially rests on the gasket to create a seal between the valve plate and the damper body to prevent substantial loss of air through the sealed chimney damper when the fireplace is not in use.

14. The sealed chimney damper of claim 13, further comprising a lever pivotally attached to the valve plate and a strike plate attached to the damper body, wherein the lever engages the strike plate to maintain the valve plate in an open position relative to the outlet aperture.

* * * * *